United States Patent
Billerot

(12) 
(10) Patent No.: US 6,335,505 B2
(45) Date of Patent: Jan. 1, 2002

(54) CONTROL OF THE PLASMA CUTTING GAS FLOW ON THE BASIS OF THE PRESSURE OF THE PILOT GAS

(75) Inventor: Francis Billerot, Saint Aubin le Cloud (FR)

(73) Assignee: Safmatic, Parthenay Cedex (FR)

( * ) Notice: Subject to any disclaimer, the term of this patent is extended or adjusted under 35 U.S.C. 154(b) by 0 days.

(21) Appl. No.: 09/784,193

(22) Filed: Feb. 16, 2001

(30) Foreign Application Priority Data

Feb. 18, 2000 (FR) .............................. 000 2025

(51) Int. Cl.$^7$ .............................................. B23K 10/00
(52) U.S. Cl. ........................... 219/121.55; 219/121.54; 219/121.39
(58) Field of Search ....................... 219/121.55, 121.54, 219/121.57, 121.39, 121.44, 75

(56) References Cited

U.S. PATENT DOCUMENTS 5,290,995 A   3/1994   Higgins et al.
5,614,110 A * 3/1997   Shintani et al. ........ 219/121.44
5,844,201 A   12/1998  Dibacco et al.
6,054,669 A * 4/2000   Warren, Jr. ............ 219/121.39

FOREIGN PATENT DOCUMENTS

DE    195 36150    4/1997
FR    2 237 720    2/1975

* cited by examiner

Primary Examiner—Mark Paschall
(74) Attorney, Agent, or Firm—Young & Thompson

(57) ABSTRACT

The invention relates to an automatic plant for cutting or welding by gas jet, especially by plasma jet, comprising a torch (T), a first pilot-gas line (L1), a second cutting- or welding-gas line (L2), control means (MP), first element (MR1) for adjusting the pressure of the pilot gas in the line (L1) and second element (MR2) for adjusting the pressure of the gas in the line (L2). The first adjustment element (MR1) are fitted in the line (L1) and controlled by control element (MP). A pneumatic control line (LP) pneumatically connects the line (L1) to the adjustment element (MR2) in order to enable the pressure of the cutting or welding gas to be adjusted in the second line (L2) on the basis of the pressure of the pilot gas in the line (L1), by acting on said second adjustment element (MR2).

10 Claims, 2 Drawing Sheets

Figure 1:
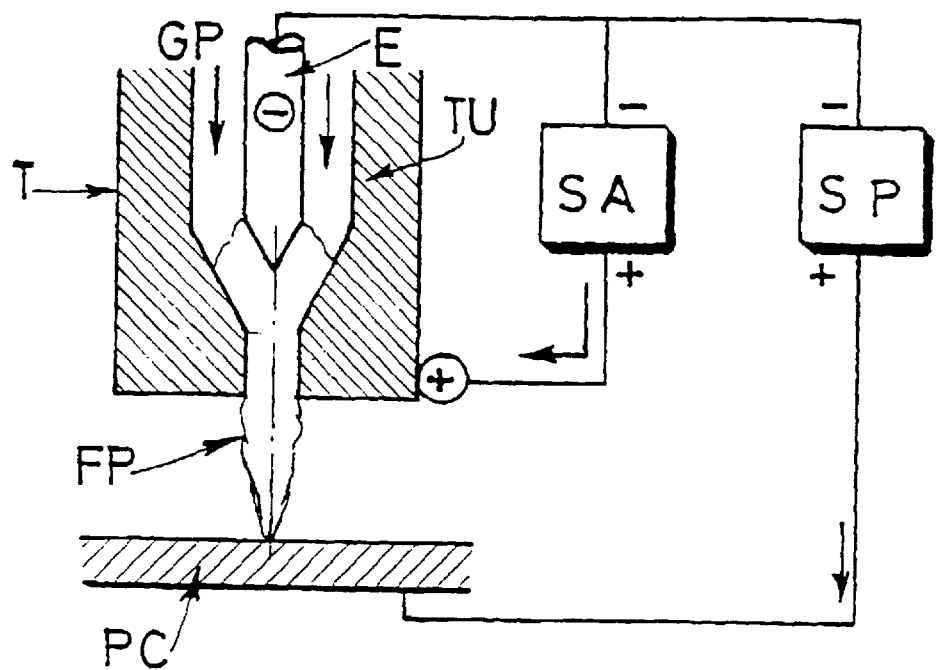

CONTROL OF THE PLASMA CUTTING GAS FLOW ON THE BASIS OF THE PRESSURE OF THE PILOT GAS

The present invention relates to an automatic plant, for cutting or welding using a jet of gas, comprising a line for supplying a torch with pilot gas and a line for supplying the torch with a cutting or welding gas, which plant comprises, in addition, control means enabling the pressure of the cutting or welding gas to be controlled according to the pressure of the pilot gas.

Plasma-arc cutting of metal, such as steel sheets, using a torch delivering a plasma jet is a very widespread process from the industrial standpoint.

Usually, a cutting operation, for example involving a steel sheet, breaks down into two distinct phases, namely an ignition phase and an actual cutting phase.

During the ignition phase, an ignition gas, otherwise called the pilot gas, is used to strike, i.e. ignite the electric arc in the torch.

More specifically, the pilot gas is ionized within the torch and an electric arc, called the pilot arc, forms within said torch.

Next, during the cutting phase, the torch is supplied with a main gas, otherwise called the cutting gas, which in general has a flow rate of about 10 to 500 l/min, which cutting gas is ionized in the electric arc which forms between the plasma torch electrode, acting as cathode, and the workpiece to be cut, acting as anode.

Depending on the circumstances, the pilot gas may be identical to or different than the cutting gas, for example, argon can be used as pilot gas and oxygen, nitrogen or a gas mixture, such as an argon/hydrogen mixture, as cutting gas.

However, in all cases, the ignition phase and the cutting or welding phase are executed one after the other and in that order.

In general, the flow rates of the pilot gas and of the cutting gas are set at the desired levels by adjustment of the pressure of these gases, respectively.

Moreover, the pilot-gas circuit and the cutting-gas circuit are usually independent of each other and the operation of the cutting torch is increasingly often controlled by automatic control means, especially control means with a microprocessor card running one or more computer programs.

However, for some types of gas, such as oxygen or hydrogen, the use of electrically-controlled pressure-reducing devices is not possible or recommended during the cutting phase, for obvious safety reasons.

Consequently, for this type of gas, the pressure-reducing devices or the pressure-reducing valve that can be used are usually of the manual-adjustment type or, depending on the circumstances, pressure-reducing valves remotely controlled by an inert gas such as hydrogen or argon, which makes it possible to alleviate the aforementioned safety problem but requires the presence of an additional source of pilot gas.

Conversely, the phase of igniting the torch is usually carried out with an inert gas with a high ionizing power, such as argon, with which the use of an electrically-controlled pressure-reducing valve does not, by contrast, pose any safety problem.

However, there is a growing demand for devices for simultaneously and automatically adjusting the pressure of the pilot gas and of the cutting gas, for example from the same operator console or via parameter tables included in computing systems, for example digital control systems.

This is because, given that the adjustments of the pilot-gas and cutting-gas pressures depend, in particular, on the metal sheets to be cut, that is on the type of material, on its thickness, on its geometric shape, etc., it is usually difficult for an operator to find, quickly and with certainty, the appropriate parameters for adjusting the pressure of these two gases.

In other words, the problem which is posed is that of being able to automatically adjust the pressure of the cutting gas and the pressure of the ignition gas in complete safety, whatever type of gas is used and without using an external source of pilot gas from the pressure-reducing valves fitted in the lines or circuits conveying, on the one hand, the pilot gas and, on the other, the cutting gas.

The solution provided by the present invention is based on control of the pressure-reducing valve fitted in the cutting-gas circuit, directly on the basis of the pressure of the pilot gas flowing in the pilot-gas circuit.

In other words, the present invention relates to an automatic plant for cutting or welding by a cutting or welding gas jet, especially by plasma jet, comprising at least:

a torch for cutting by gas jet, preferably a plasma torch;

a first line for supplying said torch with a pilot gas;

a second line for supplying said torch with a cutting or welding gas;

control means;

first means for adjusting the pressure of the pilot gas flowing in the first line, said first adjusting means being fitted in the first line and being controlled by the control means;

second means for adjusting the pressure of the cutting or welding gas flowing in the second line; and a pneumatic control line pneumatically connecting the first line to the second adjustment means in order to enable the pressure of the cutting or welding gas in the second line to be adjusted on the basis of the pressure of the pilot gas in the first line by acting on said second adjustment means.

Depending on the case, the plant according to the invention may comprise one or more of the following characteristics:

the torch is a plasma jet cutting torch;

the first adjustment means are electrically controlled, preferably first adjustment means are chosen from electrically-controlled pressure-reducing valves;

the control means are chosen from numerical control systems;

the second adjustment means are chosen from pneumatically-controlled pressure-reducing valves;

at least one solenoid valve is fitted in the first line and/or the second line, preferably at least one solenoid valve is fitted in each of said first and second lines;

at least one solenoid valve is controlled by the control means;

the control line is connected to the first line, downstream of said first adjustment means.

According to another aspect, the present invention also relates to a process for cutting or welding by a cutting or welding gas jet, in particular plasma jet, capable of being implemented by an automatic plant, such as the aforementioned plant, comprising means for adjusting the pressure of the cutting gas flowing in a line for supplying a cutting torch with cutting or welding gas, in which the means for pneumatically adjusting the cutting or welding gas are controlled on the basis of the pressure of the pilot gas.

The present invention will now be described in more detail using the appended figures, which are given by way of non-limiting illustration.

Figure 2:
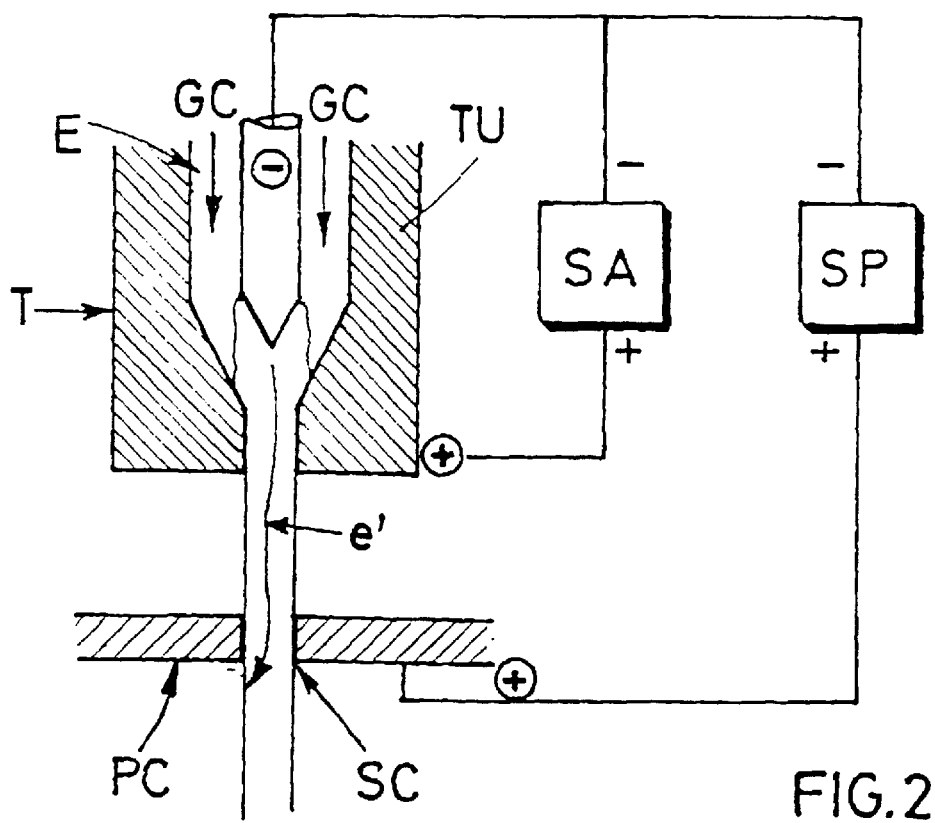

FIGS. 1 and 2 show, schematically and respectively, the ignition phase (FIG. 1) and the succeeding cutting phase (FIG. 2) during an operation of cutting, with a plasma arc, a workpiece PC to be cut, for example a steel sheet.

In FIG. 1, it can be seen that, during the phase of igniting the pilot arc, a transfer of electrons and the appearance of one or more pilot arcs between the electrode E of the plasma torch T and the nozzle TU of said plasma torch T take place.

During this phase of igniting the pilot arc, the plasma torch T is supplied with pilot gas GP, for example argon, so as to obtain a plasma flux FP delivered by the torch T in the direction of the workpiece PC to be cut.

In addition, during this ignition phase, the torch T is supplied with electric current only by an auxiliary source SA of electric current, for example a current at a voltage of 100 V and with an intensity of 15 A, while, during this ignition phase, the main source SP of electric current does not operate (U=0 V, I=0 A).

Moreover, FIG. 2 shows diagrammatically the cutting phase following the ignition phase shown in FIG. 1. More specifically, in FIG. 2, during the cutting phase, the pilot gas is replaced by a cutting gas which may be of the same type as or of a type different than the pilot gas, for example oxygen or a mixture of argon and hydrogen.

In addition, during the cutting phase, it is found that a stream of electrons appears between the electrode E and the workpiece PC to be cut until drilling and cutting along a kerf SC of said workpiece PC are obtained.

During the cutting phase, the auxiliary source SA of electric current is disconnected (U=0 V; I=0 A), while the main source SP of electric current delivers a current having an intensity and a voltage which can vary according to the thickness of the workpiece to be cut, for example, a voltage between 100 and 300 V and an intensity between 15 and 1000 A.

Figure 3:
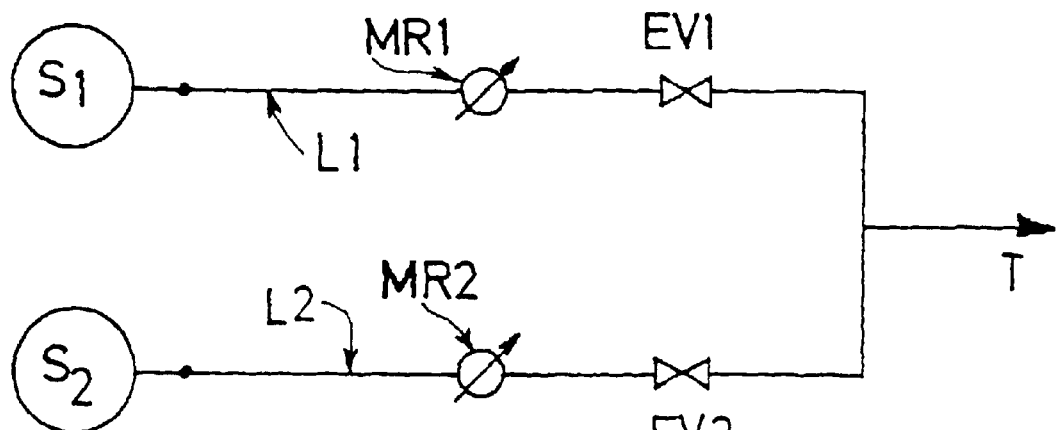

FIG. 3 shows diagramatically the supply system for a plasma torch T supplied with pilot gas and with cutting gas via two different gas circuits which are independent of each other.

More specifically, the pilot gas circuit comprises a pilot-gas supply line L1 connected, upstream, to a pilot-gas source S1 and, downstream, to the plasma torch T, and in which line L1 are fitted, on the one hand, means MR1 for manually adjusting the pressure of the pilot gas and a solenoid valve EV1 controlling the flow of said pilot gas to the plasma torch T.

Similarly, the cutting-gas circuit comprises a cutting-gas line L2 connected, upstream, to a cutting-gas source S2 and, downstream, to the plasma torch T, and in which line L2 are fitted, on the one hand, means MR2 for manually adjusting the pressure of the cutting gas and a solenoid valve EV2 controlling the flow of cutting gas to the plasma torch T.

This type of system, known from the prior art, has many disadvantages, especially that of requiring manual adjustment of the pilot-gas pressure and of the cutting-gas pressure by direct action by the operator on the adjustment means MR1 and MR2, respectively.

Figure 4:
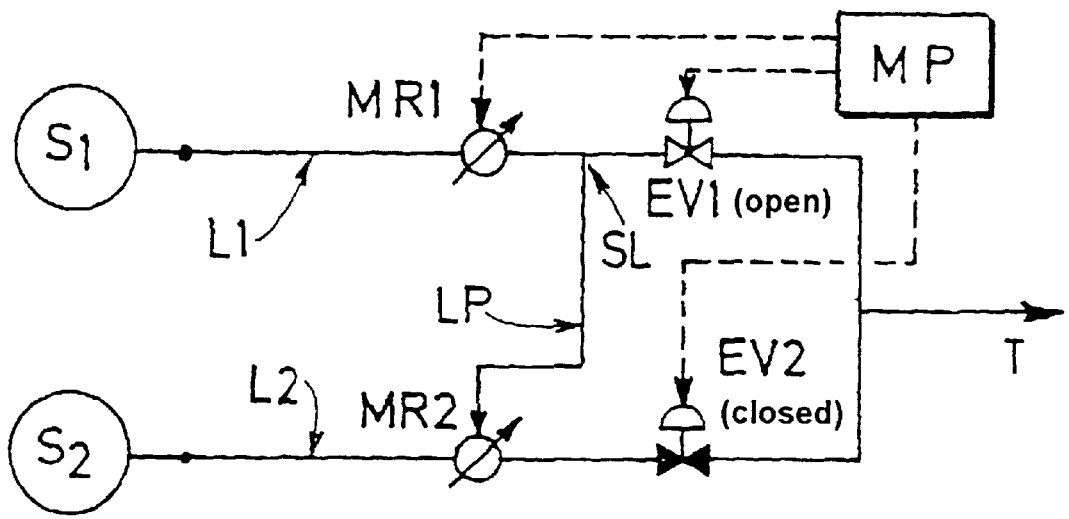
Figure 5:
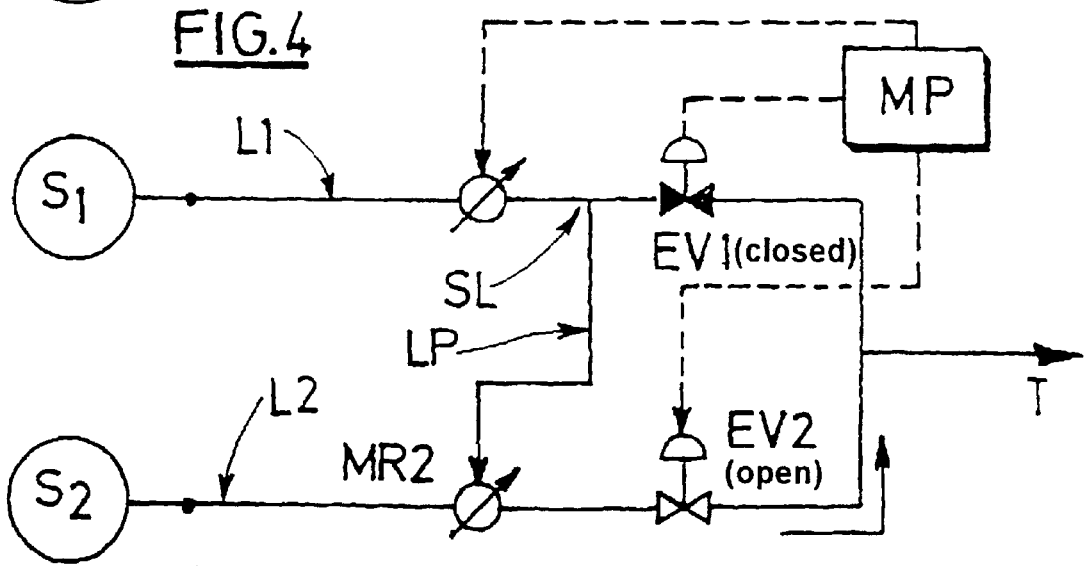

FIGS. 4 and 5 show the layout of a system for supplying a plasma torch T with a pilot gas and with a cutting gas, respectively, according to the present invention.

More specifically, FIG. 4 shows diagramatically the operation of the system for supplying pilot gas and cutting gas during the ignition phase, whereas FIG. 5 shows the operation of the supply system during the cutting phase.

In FIG. 4, it can be seen that, during the ignition phase, the pilot gas is transported to the plasma torch T by the line L1, provided that the solenoid valve EV1 operated by the control means MP is in the open position, i.e. the valve allows pilot gas to pass through to the torch T and, in addition, the electrically- or pneumatically-controlled solenoid valve EV2, in the closed position, then prohibits cutting gas passing through to the torch T.

The pressure of the pilot gas in the pilot-gas line L1 is adjusted via electrically-controlled pressure-adjustment means MR1, for example an electrically-controlled pressure-reducing valve controlled by control means MP.

In contrast, the pressure of the cutting-gas in the cutting-gas supply line is adjusted, in this case, by pneumatic-control pressure-adjustment means MR2, which are controlled by the pressure of the pilot gas in the pilot-gas line L1.

This is because the pilot-gas line L1 has a bypass or pneumatic control line LP, connected to the pilot-gas line L1, at a connection point SL located downstream of the adjustment means MR1 but upstream of the solenoid valve EV1.

In this way, by acting on the pilot-gas pressure-adjustment means MR1, the control means MP generate a first pressure P1 of the pilot gas downstream from said adjustment means MR1, in particular in the pneumatic control line LP, which first pressure P1 will act on the cutting-gas pressure-adjustment means MR2 in order to set the desired cutting-gas pressure level PX when the flow rate of said cutting gas is zero (EV2 being in the closed position).

Then, as shown in FIG. 5, during the cutting phase the process is reversed, i.e. the control means control the solenoid valve EV1 which closes, prohibiting the pilot gas from passing through to the plasma torch T and, in addition, controlling the solenoid valve EV2 which opens, allowing the cutting gas to pass through to the torch T.

In addition, the control means also act on the pilot-gas pressure-adjustment means MR1 so as to set the pressure of the pilot gas to a second pressure level P2, which generates a change of pressure within the pneumatic control line LP, which pressure change has a knock-on effect on the cutting-gas pressure-adjustment means MR2, which are then controlled in order to adjust the cutting-gas pressure to a desired cutting-gas pressure and flow rate.

It is therefore understood that the device according to the present invention makes it possible to use any type of gas as cutting gas, especially gases likely to pose safety problems, such as oxygen or hydrogen, provided that, according to the invention, the cutting-gas pressure-adjustment means are pneumatically controlled, which prevents any danger, provided that the cutting-gas pressure-adjustment means MR2 is not electrically controlled.

In other words, according to the present invention, it is possible to control the flow rate and pressure of two different gases, namely a pilot gas and a cutting gas, requiring pressure and flow rate adjustments which are different from one another, with a single adjustable electric set-point line.

The present invention is applicable to automatic cutting machines using a plasma torch or an oxycutting torch, but also to an automatic machine using a welding torch or, more generally, to any type of machine for delivering gas with a high flow rate, in particular oxygen and/or hydrogen, requiring a sequence of pressures of different gases on the basis of one and the same electrical set point origin.

What is claimed is:

1. An automatic plant for cutting and welding by gas jet, in particular for cutting by plasma jet, which comprises at least:
   a cutting torch (T);
   a first line (L1) for supplying said torch (T) with a pilot gas;

a second line (L2) for supplying said torch (T) with a cutting or welding gas;

control means (MP);

first means (MR1) for adjusting the pressure of the pilot gas flowing in the first line (L1), said first adjusting means (MR1) being fitted in the first line (L1) and being controlled by the control means (MP);

second means (MR2) for adjusting the pressure of the cutting or welding gas flowing in the second line (L2); and a pneumatic control line (LP) pneumatically connecting the first line (L1) to the second adjustment means (MR2) in order to enable the pressure of the cutting or welding gas in the second line (L2) to be adjusted on the basis of the pressure of the pilot gas in the first line (L1) by acting on said second adjustment means (MR2).

2. The plant as claimed in claim 1, wherein the first adjustment means (MR1) are electrically controlled, preferably first adjustment means (MR1) being chosen from electrically-controlled pressure-reducing valves.

3. The plant as claimed in claim 1, wherein the control means (MP) are chosen from numerical control systems.

4. The plant as claimed in claim 1, wherein the second adjustment means (MR2) are chosen from pneumatically-controlled pressure-reducing valves.

5. The plant as claimed in claim 1, wherein at least one solenoid valve (EV1, EV2) is fitted in the first line (L1) and/or the second line (L2), preferably at least one solenoid valve (EV1, EV2) is fitted in each of said first and second lines (L1, L2).

6. The plant as claimed in claim 1, wherein at least one solenoid valve (EV1, EV2) is controlled by the control means (MP).

7. The plant as claimed in claim 1, wherein the control line (LP) is connected to the first line (L1), downstream of said first adjustment means (MR1).

8. The plant as claimed in claim 1, wherein the torch (T) is a torch for cutting by plasma jet or an oxycutting torch.

9. The plant as claimed in claim 1, wherein the first supply line (L1) is supplied with pilot gas from at least one source of pilot gas (S1) and wherein the second supply line (L2) is supplied with cutting or welding gas from at least one source of cutting or welding gas (S2).

10. A cutting or welding process, in particular capable of being implemented by a plant as claimed in claim 1, in which the adjustment means for the cutting or welding gas are pneumatically controlled on the basis of the pressure of the pilot gas, preferably a plasma cutting process.

* * * * *